United States Patent [19]

Tsao et al.

[11] 4,156,035

[45] May 22, 1979

[54] PHOTOCURABLE EPOXY-ACRYLATE COMPOSITIONS

[75] Inventors: Jung-Hsien Tsao; Arthur D. Ketley, both of Columbia, Md.

[73] Assignee: W. R. Grace & Co., New York, N.Y.

[21] Appl. No.: 904,157

[22] Filed: May 9, 1978

[51] Int. Cl.$^2$ ............................. C08F 2/46; C08F 8/00
[52] U.S. Cl. ..................... 427/44; 96/115 P; 96/115 R; 204/159.11; 204/159.15; 204/159.16; 204/159.18; 204/159.24; 260/836; 260/837 R; 427/54; 428/418; 428/461
[58] Field of Search ............... 427/44, 54; 204/159.11, 204/159.14, 159.15, 159.16, 159.18, 159.24

[56] References Cited

U.S. PATENT DOCUMENTS

| | | | |
|---|---|---|---|
| 3,753,755 | 8/1973 | Olson | 117/3.1 |
| 4,025,407 | 5/1977 | Chang et al. | 204/159.14 |
| 4,026,705 | 5/1977 | Crivello et al. | 96/27 R |
| 4,069,054 | 1/1978 | Smith | 96/115 P |

*Primary Examiner*—Richard B. Turer
*Attorney, Agent, or Firm*—Richard P. Plunkett; William W. McDowell, Jr.

[57] ABSTRACT

This invention relates to radiation curable compositions comprising mixtures of epoxy resin and di- or polyacrylate or methacrylate terminated monomers in combination with a catalyst system comprising a carbonyl type photoinitiator with an aromatic onium salt capable of effecting the cure by release of a Lewis Acid.

11 Claims, No Drawings

PHOTOCURABLE EPOXY-ACRYLATE COMPOSITIONS

This invention relates to photopolymerizable compositions, elements and processes of photopolymerization. More particularly, it relates to mixtures of methacrylate or acrylate-terminated monomers and epoxy resin compositions which can be cured by exposure to radiant energy and methods therefor.

It is known by Schlesinger, U.S. Pat. No. 3,708,296, that certain photosensitive aromatic diazonium salts can be employed to cure epoxy resins. When photolyzed, these aromatic diazonium salts are capable of releasing, in situ, a Lewis Acid catalyst which can initiate the rapid polymerization of the epoxy resin. However, even though these one package epoxy resin mixtures can provide fast curing compositions, a stabilizer must be used to minimize cure in the dark during storage of these mixtures. Despite these measures, gellation of the mixture can occur even in the absence of light. In addition, nitrogen is released during UV cure, which can result in film imperfections. Diazonium salts are generally thermally unstable, rendering the use of such materials hazardous because of the possibility of run-away decomposition. Radiation curable epoxy compositions have also been disclosed by Crivello, U.S. Pat. No. 4,069,055, where it is shown that radiation sensitive aromatic onium salts of Group Va elements, such as

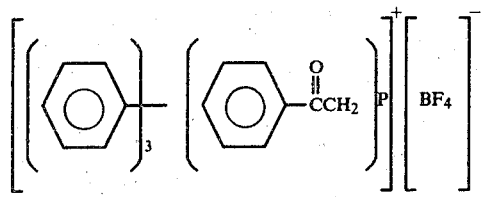

can be incorporated in epoxy resins to provide one package radiation curable compositions which do not require a stabilizer to minimize cure at ambient temperatures during the shelf period and are free of all of the aforementioned disadvantages of the aromatic diazonium salt compositions.

It is also known to form crosslinked polymers by irradiating materials containing groups:

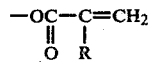

where R=H or $CH_3$ with high energy radiation or ultra violet radiation. In the latter case, polymerization is most effectively carried out in the presence of a sensitizer or photoinitiator. Photoinitiator materials that have been shown to be effective in this regard are compounds having the structural group:

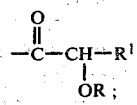

see Sandoner et al., U.S. Pat. No. 3,715,293; those containing α-substituted benzoins of the formula:

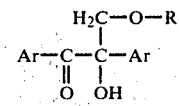

Heine et al., U.S. Pat. No. 3,657,088, and mixtures of aromatic ketones such as benzophenone and benzoin ethers, Gruber, U.S. Pat. No. 4,017,652, all incorporated herein by reference.

The two types of compositions, i.e., the radiation curable epoxies containing Gp VIa onium salts and the di- or polyacrylates or methacrylates containing ketone-type sensitizers are believed to cure by quite different mechanisms. In the case of the epoxy systems, irradiation of the catalyst produces a Lewis Acid which then initiates cationic polymerization of the epoxide. Polymerization of acrylic and methacrylic compounds is not known to occur cationically, but by free radicals. The radiation cure of these latter materials is, therefore, initiated by radicals generated by the homolytic photodecomposition of the sensitizer.

The radiation cure of epoxy resin compositions catalyzed by the photodecomposition of Gp VIa salts is free of air inhibition so that cure in air results in tack-free films. However, at catalyst concentrations such that adequate cure speeds can be obtained for practical applications, only thin films (1–2 mils) can be effectively cured. Thicker layers such as would be used in relief printing plates, floor tile coatings and certain electronic applications require extremely long cure times to achieve through cure.

In contrast, acrylic formulations containing carbonyl type initiators through cure readily in thick sections, but are subject to air inhibition at the surface. Consequently, such formulations require an inert atmosphere in order to cure tack-free, particularly as thin films.

Surprisingly, we have now found that mixtures of epoxy resins with acrylic or methacrylic monomers can be photocured in air by Group VIa onium salts, in particular sulfonium salts, in combination with free radical photoinitiators such as benzoin ethers, in thick sections tack-free and, hence, these formulations show neither the disadvantages of the photocurable epoxy systems nor the photocurable acrylics when cured separately. Free radical photoinitiators such as benzoin ethers added to such formulations also result in improved cured properties, such as hardness, as will be exemplified hereinafter.

Group VIa onium salts operable in this invention are those taught by U.S. Pat. No. 4,058,401 incorporated herein by reference and can be expressed by the formula:

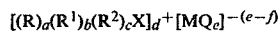

where R is a monovalent aromatic organic radical, $R^1$ is a monovalent organic aliphatic radical selected from alkyl, cycloalkyl and substituted alkyl, $R^2$ is a polyvalent organic radical forming a heterocyclic or fused ring structure selected from aliphatic radicals and aromatic radicals, X is a Group VIa element selected from sulfur, selenium and tellurium, M is a metal or metalloid, Q is a halogen radical, a is a whole number equal to 0 to 3 inclusive, b is a whole number equal to 0 to 2 inclusive, c is a whole number equal to 0 to 1, where the sum of a+b+c is a value equal to 3 or the valence of X; d=e−f; f=valence of M and is an integer equal to from 2 to 7 inclusive and e is >f and is an integer having a value up to 8.

Radicals included by R are, for example, $C_{(6-13)}$ aromatic hydrocarbon radicals such as phenyl, tolyl, napthyl, anthryl and such radicals substituted with up to 1 to 4 monovalent radicals such as $C_{(1-8)}$ alkoxy, $C_{(1-8)}$ alkyl, nitro, chloro and hydroxy and aromatic heterocyclic radicals such as pyridyl and furfuryl. $R^1$ radicals include $C_{(1-8)}$ alkyl and substituted alkyl such as $-C_2H_4OCH_3$, $-CH_2COOC_2H_5$, $-CH_2COCH_3$ and the like. $R^2$ radicals include such structures as

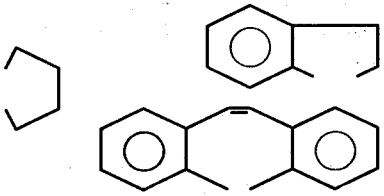

and members of the group consisting of monofunctional alkyl or aryl radicals, substituted or unsubstituted. Complex anions included by $[MQ_e]^{-(e-f)}$ are, for example, $BF_4^-$, $PF_6^-$, $AsF_6^-$, $AlF_6^=$, $ZrF_6^=$, $GaCl_4^-$, $InF_4^-$, $TiF_6^=$, $SbF_6^-$, $FeCl_4^=$, $SnCl_6^=$, $SbCl_6^-$, $BiCl_5^=$ and the like, where M is more particularly a transition metal such as Sb, Fe, Sn, Bi, Al, Ga, In, Ti, Zr, Sc, V, Cr, Mn, Co, a rare earth element such as a lanthanide, for example, Ce, Pr, Nd, an actinide such as Th, Pa, U, Np, or a metalloid such as B, P, As and the like.

The present invention relates to epoxy compositions comprising:

A. an epoxy resin polymerizable to a higher molecular weight state selected from epoxy monomer, epoxy prepolymer, oxirane containing organic polymer and mixtures thereof, and B. a polymerizable monomer containing at least two groups of the type

where R=H or $CH_3$;

C. an effective amount of a radiation sensitive aromatic onium salt of a Group VIa element capable of effecting the cure of (A) by release of a Lewis Acid catalyst when exposed to radiant energy, and D. a carbonyl-type photoinitiator.

In a preferred embodiment of this invention, the Group VIa onium salt is triphenyl sulfonium tetrafluoroborate or triphenyl sulfonium hexafluorophosphate:

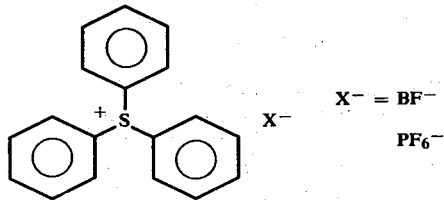

The term "epoxy resin" as utilized in the description of the curable compositions of the present invention includes any monomeric, dimeric, oligomeric or polymeric epoxy material containing one or a plurality of epoxy functional groups. For example, those resins which result from the reaction of bisphenol-A (4,4′-isopropylidenediphenol) and epichlorohydrin, or by the reaction of low molecular weight phenol-formaldehyde resins (Novolak resins) with epichlorohydrin, can be used alone or in combination with an epoxy containing compound as a reactive diluent. Such reactive diluents as phenyl glycidyl ether, 4-vinylcyclohexene dioxide, limonene dioxide, 1,2-cyclohexane oxide, glycidyl acrylate, glycidyl methacrylate, styrene oxide, allyl glycidyl ether and the like may be added as viscosity modifying agents. In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxy-siloxane resins, epoxy-polyurethanes and epoxy-polyesters. Further examples of epoxy resins which can be used are shown in the Encyclopedia of Polymer Science and Technology, Vol. 6, 1967, Interscience Publishers, New York, pp. 209-271, incorporated herein by reference.

The term "polymerizable monomer containing two or more

where R is H or $CH_3$" includes multifunctional acrylate and methacrylate materials such as trimethylol propane triacrylate, pentaerythritol triacrylate, ethylene glycol diacrylate, diethylene glycol diacrylate, 1,6-hexanediol diacrylate, etc., and the corresponding methacrylates. Monofunctional materials such as ethyl hexyl acrylate and methacrylate can be incorporated as reactive diluents.

While the onium catalysts will cure both the epoxy and the acrylate leading to the formation of in situ polymer blends, faster cures may be obtained by the addition of carbonyl type photoinitiators, i.e., the aldehyde and ketone carbonyl compounds having at least one aromatic nucleus attached directly to the

group that are known to photodecompose to free radicals in the presence of UV light. Various photoinitiators are operable and well known to those skilled in the art. Examples of carbonyl type photoinitiators operable herein include, but are not limited to, benzophenone, acetophenone, methyl ethyl ketone, valerophenone, hexanophenone, α-phenylbutyrophenone, p-morpholinopropiophenone, dibenzosuberone, 4-morpholinobenzophenone, 4′morpholinodeoxybenzoin, p-diacetylbenzene, 4-aminobenzophenone, 4′-methoxyacetophenone, benzaldehyde, α-tetralone, 2-acetylphenanthrene, 10-thioxanthenone, 3-acetylindole, 9-fluorenone, 1-indanone, thioxanthene-9-one, xanthene-9-one, 7-H-benz[d]anthracene-7-one, 1-napthaldehyde, 4,4′-bis(dimethylamino)benzophenone, fluorene-9-one, 1′-acetonaphthone, 2′-acetonaphthone, o-methoxybenzophenone, benz[a]anthracene-7,12-dione, benzoin isopropyl ether, 1,1-dimethoxy, 1-phenyl acetophenone, benzoin isobutyl ether, benzoin tetrahydropyranyl ether, 2,2-diethoxyacetophenone, 2,2-dimethoxy-2-phenylacetophenone, 2,3-butanedione and the like.

The compositions to be cured, i.e., (converted to solid materials or coatings) in accord with the present invention are ordinarily transparent or translucent but may, if desired, include such additives as accelerators, dyes, inhibitors, activators, fillers, pigments, anti-static agents, flame-retardant agents, thickeners, thixotropic agents, surface active agents, viscosity modifiers, extending oils, plasticizers, tackifiers and the like within the scope of this invention. Such additives are usually preblended with the epoxides prior to or during the compounding step. Operable fillers include natural and synthetic resins, carbon black, glass fibers, wood flour, mica flour, clay, silica, alumina, carbonates, oxides, hydroxides, silicates, glass flakes, glass beads, borates, phosphates, diatomaceous earth, talc, kaolin barium sulfate, calcium sulfate, calcium carbonate, antimony oxide, sand and the like. The aforesaid additives may be present in quantities up to 500 parts per 100 parts of the epoxy compositions by weight and preferably 0.005–300 parts on the same basis.

In addition to these substantially inert additives, various reactive additives can be added that are capable of being polymerized by cationic reagents or of reacting with the epoxide during its polymerization. Examples of such materials are vinyl ethers and polyols of various kinds.

The preferred means of curing is by means of electromagnetic radiation of wavelength about 2,000–7,000 Å. Such radiation can be obtained by the use of high or medium pressure mercury lamps, xenon lamps, mercury xenon lamps, lasers, etc. Lamps may be long arc or short arc, water or air cooled. The lamps can include envelopes capable of transmitting light of a wavelength of from about 1,849 Å to 4,000 Å and preferably 2,400 Å to 4,000 Å. The lamp envelope can consist of quartz, such as Spectrocil or of Pyrex, etc. Typical lamps which can be employed for providing ultraviolet radiation are, for example, medium pressure mercury arcs, such as the GE H3T7 arc and the Hanovia 200 w/inch arc lamp. The cures may be carried out with a combination of various lamps, if desired.

Although the preferred means of curing is by means of electromagnetic radiation of wavelength of about 2,000–7,000 Å (because of simplicity, economy and convenience), the epoxy composition of the instant invention can be cured also by high energy ionizing irradiation. A preferred feature of the ionizing irradiation operation of the instant invention is treatment with high energy particle irradiation or by gamma-rays or X-rays. Irradiation employing particles in the instant invention includes the use of positive ions (9. e., protons, alpha particles and deuterons and also electrons or neutrons). The charged particles may be accelerated to high speeds by means of various voltage gradient mechanisms such as a Van de Graaff generator, a cyclotron, a Cockroft Walton accelerator, a resonant cavity accelerator, a betatron, a G.E. resonant transformer, a synchroton or the like.

The materials of this invention are of particular use as coatings that can be UV cured in air on a wide variety of substrates such as paper, wood, glass, aluminum, tin plate, plastic and the like.

The following examples are set out to explain, but expressly not limit, the instant invention. Unless otherwise noted, all parts and percentages are by weight.

EXAMPLE 1

The following master batch formulations were prepared.

A 500 g epoxy mixture consisting of 80 parts of commercially available 3,4-epoxycyclohexylmethyl-3,4-epoxycyclohexane carboxylate having the epoxy equivalent weight of 133 was admixed with 20 parts of commercially available diglycidyl ether of Bis-phenol A having an epoxy equivalent weight of 185. The resultant product will be referred to hereinafter as Epoxy Mixture A.

A 500 g acrylate mixture was made up consisting of 50 parts of commercially available diethylene glycol diacrylate, 30 parts of commercially available trimethylolpropane triacrylate and 20 parts of commercially available 2-ethyl hexyl acrylate. The resultant mixture will hereinafter be referred to as Polyacrylate Mixture B.

A 500 g epoxy-monoacrylate material consisting of glycidyl acrylate will hereinafter be referred to as Epoxy-monoacrylate Monomer C.

EXAMPLE 2

Various photocurable mixtures were made up using Epoxy Mixture A, Polyacrylate Mixture B and Epoxy-monoacrylate Monomer C from Example 1 with various catalyst systems. Each formulation was charged to a 30 ml beaker, filling the beaker to a height of 2 cm. The beaker was then wrapped with aluminum foil around the sides so that on exposure to UV radiation only exposure from directly above was obtained. Each beaker was exposed for 105 seconds to UV radiation from a 5,000 watt short arc Ascor Addalux lamp. The results are shown in TABLE I.

TABLE I

| Component | Formulation | | | | | |
|---|---|---|---|---|---|---|
| | 1 | 2 | 3 | 4 | 5 | 6 |
| Epoxy Mixture A | 100 | | 60 | 60 | 60 | 60 |
| Polyacrylate Mixture B | | 100 | | | 40 | 40 |
| Epoxy-Monoacrylate Monomer C | | | 40 | 40 | | |
| Triphenyl Sulfonium Hexafluorophosphate | 2.0 | | 2.0 | 2.0 | 2.0 | 2.0 |
| 2,2-Dimethoxy-2-Phenyl-Acetophenone | | 1 | | 1 | | 1 |
| γ-Butyrolactone[1] | 3.5 | | 3.5 | 3.5 | 3.5 | 3.5 |
| Cure Thickness (cm) in 105 Sec. | 0.076 | 0.36 | 0.10 | 0.14 | 0.19 | 0.25 |

[1]Solvent for Sulfonium Salt

As can be seen from the results in TABLE I, an appreciable thicker cure is obtained when an acrylate and a carbonyl type photosensitizer is added to the epoxyoxonium salt system.

To show the improved curing rate and hardness of the epoxy-acrylate system in combination with the two component catalyst system, the following example was performed.

EXAMPLE 3

Formulations of Example 2 were used except that 1.0 g/100 g formulation of a wetting agent mixture comprising 75 parts of a silicone oil commercially available from Dow Corning under the tradename "DC-190" and 25 parts of a non-ionic fluorochemical surfactant sold under the tradename "FC-430" by 3M Corp. was added to each formulation. The formulations were then coated on DOS tin plate with a hand-roller, placed on a conveyor belt and exposed to ultraviolet light in a UV curing unit. The curing unit consisted of two medium pressure mercury lamps (200 watts/inch) 28 cm apart and situated 8 cm above the conveyor belt on which the coated plates were placed. The hardness of the cured coating was measured by the pencil hardness test. The results are shown in TABLE II.

TABLE II

| Component | Formulation | | | |
|---|---|---|---|---|
| | 1 | 2 | 3 | 4 |
| Epoxy Mixture A | 100 | | 60 | 60 |
| Polyacrylate Mixture B | | 100 | 40 | 40 |
| Triphenyl Solfonium Hexafluorophosphate | 2.0 | | 2.0 | 2.0 |
| 2,2-Dimethoxy-2-Phenyl Acetophenone | | 1.0 | | 1.0 |
| γ-Butyrolactone[(1)] | 3.5 | | 3.5 | 3.5 |
| Cure Time (sec.) | 1.2 | 12.0 | 0.7 | 0.7 |
| Pencil Hardness | F | tacky | 2 B | H |

[(1)]Solvent for Sulfonium Salt

As can be seen in TABLE II, the addition of a carbonyl type initiator to the catalyst system results in a harder film coating under the same UV exposure time and conditions.

The catalyst combination employed herein can be added to the system in varying amounts. That is, the onium salt is added in an amount ranging from 0.1 to 10.0% and the carbonyl photoinitiator in an amount ranging from 0.05 to 10.0%, both based on the combined weight of the epoxy and acrylate or methacrylate in the curable composition.

The weight ratio of the epoxy to acrylate or methacrylate can vary between wide limits. Weight ratios of epoxy to acrylate or methacrylate in the range from 1:99 to 99:1, respectively, are operable herein. A preferred weight ratio range of epoxy to acrylate or methacrylate is from 1:1 to 1:0.05, respectively.

We claim:
1. A composition comprising:
   A. an epoxy resin polymerizable to a higher molecular weight state and containing one or more epoxy functional groups selected from an epoxy monomer, epoxy prepolymer, oxirane containing polymer and mixtures thereof;
   B. a polymerizable monomer containing at least two

groups wherein R is H or CH$_3$;
   C. an effective amount of a radiation sensitive aromatic onium salt of a Gp. VIa element capable of effecting the cure of (A) by release of a Lewis Acid catalyst when exposed to radiant energy and
   D. a carbonyl-type photoinitiator.

2. The composition according to claim 1 in which component C is triphenyl sulfonium fluoroborate.

3. The composition according to claim 1 in which Component C is triphenyl sulfonium hexafluorophosphate.

4. The composition according to claim 1 in which Component C is triphenyl sulfonium hexafluoroantimonate.

5. The composition according to claim 1 in which Component D is a benzoin alkyl ether.

6. A process for coating a substrate which comprises applying a thin layer of the composition of claim 1 to the substrate and curing the composition by exposing the layer to radiation.

7. The process according to claim 6 wherein the radiation is UV radiation.

8. The process according to claim 6 wherein the radiation is high energy ionizing radiation.

9. The process of curing an epoxy-acrylate or methacrylate mixture which comprises exposing the composition of claim 1 to radiation.

10. The process according to claim 9 wherein the radiation is UV radiation.

11. The process according to claim 9 wherein the radiation is high energy ionizing radiation.

* * * * *